US010860206B2

(12) United States Patent
Mennechet et al.

(10) Patent No.: US 10,860,206 B2
(45) Date of Patent: Dec. 8, 2020

(54) PLANNING METHOD OF A FLIGHT OF AN AIRCRAFT, ASSOCIATED DISPLAY COMPUTER PROGRAM PRODUCT AND PLANNING SYSTEM

(71) Applicant: THALES, Courbevoie (FR)

(72) Inventors: Florent Mennechet, Mérignac (FR); Valéry Bota, Mérignac (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/579,242

(22) Filed: Sep. 23, 2019

(65) Prior Publication Data

US 2020/0097168 A1    Mar. 26, 2020

(30) Foreign Application Priority Data

Sep. 26, 2018   (FR) ...................................... 18 00996

(51) Int. Cl.
| | |
|---|---|
| *G06F 3/0488* | (2013.01) |
| *B64D 43/00* | (2006.01) |
| *G06T 17/05* | (2011.01) |
| *G08G 5/00* | (2006.01) |
| *G06F 3/0481* | (2013.01) |

(52) U.S. Cl.
CPC ......... *G06F 3/04883* (2013.01); *B64D 43/00* (2013.01); *G06F 3/04815* (2013.01); *G06T 17/05* (2013.01); *G08G 5/003* (2013.01); *G08G 5/0021* (2013.01); *G08G 5/0034* (2013.01); *G08G 5/0039* (2013.01)

(58) Field of Classification Search
CPC .... G08G 5/003; G08G 5/0034; G08G 5/0039; G08G 5/0021; G06F 3/04883; G06F 3/04815; B64D 43/00; G06T 17/05
See application file for complete search history.

(56) References Cited

U.S. PATENT DOCUMENTS

| | | | | |
|---|---|---|---|---|
| 6,169,516 | B1* | 1/2001 | Watanabe | .......... G01C 21/3635 |
| | | | | 342/357.51 |
| 2007/0022376 | A1* | 1/2007 | Stephane | ................ G06F 3/013 |
| | | | | 715/700 |

(Continued)

OTHER PUBLICATIONS

French Search Report, from the French Patent Office in counterpart French Application No. 1800996, dated Aug. 22, 2019.

*Primary Examiner* — Daniel Samwel
(74) *Attorney, Agent, or Firm* — Arent Fox LLP

(57) ABSTRACT

The invention relates to a method for planning the flight of a pilot-piloted aircraft and comprising a tactile head-down display defining a display plane and displaying images representing a three-dimensional surface viewed in perspective through the display plane, and arranged with respect to this display plane according to a display parameter.
The method comprises the following steps:
  acquisition of information relating to a tactile displacement on the display screen;
  association of the information relating to the tactile displacement with a first set of points located in the display plane;
  projection of the first set of points on the displayed three-dimensional surface in order to obtain a second set of geographical points located on this three-dimensional surface; and
  display of images representing the second set.

10 Claims, 4 Drawing Sheets

(56) References Cited

U.S. PATENT DOCUMENTS

| | | | |
|---|---|---|---|
| 2014/0028476 A1* | 1/2014 | Kolbe | G08G 5/0021 340/971 |
| 2015/0006078 A1* | 1/2015 | Dorfmann | G08G 5/0021 701/533 |
| 2015/0356873 A1* | 12/2015 | Kneuper | G08G 5/0052 701/439 |
| 2016/0078769 A1* | 3/2016 | Coulmeau | G08G 5/0034 701/537 |
| 2018/0261104 A1* | 9/2018 | Jonak | G08G 5/0039 |
| 2019/0108680 A1* | 4/2019 | Querejeta Masaveu | G08G 5/0052 |
| 2019/0227558 A1* | 7/2019 | Lampazzi | B64D 45/00 |
| 2020/0019189 A1* | 1/2020 | Chen | G08G 5/0069 |

* cited by examiner

PLANNING METHOD OF A FLIGHT OF AN AIRCRAFT, ASSOCIATED DISPLAY COMPUTER PROGRAM PRODUCT AND PLANNING SYSTEM

CROSS-REFERENCE TO RELATED APPLICATIONS

This application is a U.S. non-provisional application claiming the benefit of French Application No. 18 00996, filed on Sep. 26, 2018, which is incorporated herein by reference in its entirety.

FIELD OF THE INVENTION

The present invention relates to a method for planning the flight of an aircraft that can be piloted by at least one pilot and comprising a tactile head-down display screen.

The present invention also relates to a computer program product and an associated scheduling system.

BACKGROUND

It is known to plan the flight of the aircraft prior to take-off by defining a flight plan and the planned trajectory to be followed by the aircraft. However, it is important that, during the flight of the aircraft, the pilot may adapt the planned trajectory according to various external elements such as other aircraft or geographical obstacles.

In addition, certain flight planning tools make it possible to annotate and draw various elements on a map, which enable the pilot to identify elements of interest more easily.

However, these annotations are not always very precise and can not always be taken into account without appropriate corrections on the part of the pilot. It is then not easy for the pilot to take into account these elements in order to better adapt his trajectory.

SUMMARY

The present invention aims to facilitate the identification of elements external to the aircraft to be taken into account by the pilot so as to facilitate the planning of the trajectory of the aircraft during flight.

For this purpose, the invention relates to a method for planning the flight of an aircraft controllable by at least one pilot and comprising a tactile head-down display screen, wherein the display screen defines a display plane and displays images representing a three-dimensional perspective surface viewed through the display plane and arranged with respect to this display plane as a function of at least one display parameter; wherein the planning method comprises the following steps:
  acquisition of information relating to a tactile displacement made by the pilot on the head-down display screen;
  association of information relating to the pilot's tactile displacement with a first set of points located in the display plane;
  projection of the first set of points on the displayed three-dimensional surface in order to obtain a second set of geographical points located on this three-dimensional surface; and
  display of the images representing the second set of points.

According to other advantageous aspects of the invention, the planning method comprises one or more of the following characteristics, taken in isolation or in any technically feasible combination:
  the three-dimensional surface corresponds to the relief of the terrain overflown by the aircraft;
  the projection of the first set of points on the three-dimensional surface takes place in a projection direction orthogonal to the display plane;
  the planning method further comprises a step of transmitting the second set of points to a remote system of the aircraft;
  the planning method further comprises a step of receiving at least a third set of geographical points from a remote system of the aircraft, and a step of displaying the third set of points on the head-down display screen;
  the information acquired during the tactile displacement of the pilot along a closed line is the inner surface defined by the closed line;
  the planning method comprises a step of validation or cancellation of the display based on information provided by the pilot; and
  the planning method comprises a step of storage of the second set of points in a memory external to the aircraft.

The invention also relates to a computer program product comprising software instructions which, when implemented by computer equipment, implement a planning method as defined above.

The invention also relates to a planning system designed to be embedded in an aircraft that can be piloted by at least one pilot and comprising a tactile head-down display screen, the head-down display screen defining a display plane and displaying images representing a three-dimensional perspective surface viewed through the display plane, and disposed with respect to said display plane as a function of at least one display parameter; the planning system comprising:
  an acquisition module designed to acquire a tactile displacement performed by the pilot on the head-down display screen;
  a processing module designed to associate the information relating to the pilot's tactile displacement with a first set of points, the first set of points being located in the display plane;
  a projection module designed to project the first set of points on the displayed three-dimensional surface in order to obtain a second set of geographical points located on this three-dimensional surface; and
  an output module designed to display an image representing the second set of points.

BRIEF DESCRIPTION OF THE DRAWINGS

These features and advantages of the invention will become apparent upon reading the description which follows, given solely by way of non-limiting example, and with reference to the appended drawings, in which.

DETAILED DESCRIPTION

Figure 1:
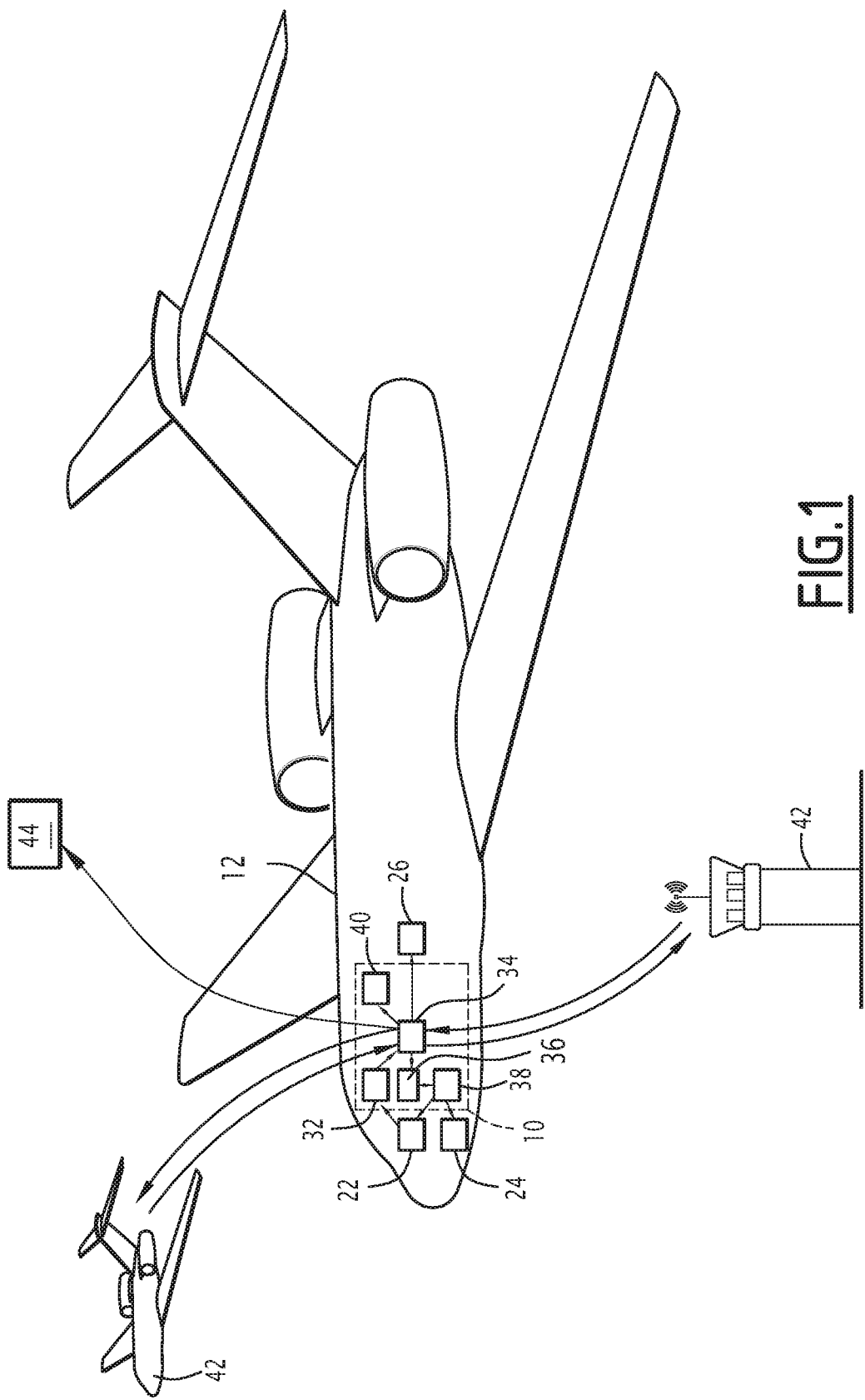
FIG. 1 shows a schematic view of a planning system embedded in an aircraft, according to the invention.

A planning system 10 is shown in FIG. 1. This system 10 is embedded in an aircraft 12.

The term "aircraft" 12 herein refers to any airplane or helicopter or any other flying machine pilotable by a pilot 14 from this aircraft.

According to another exemplary embodiment, the aircraft 12 may be a remotely controllable drone. In this case, the planning system 10 is disposed in a control center, for example terrestrial, from which the piloting of the drone may be performed.

Figure 2:
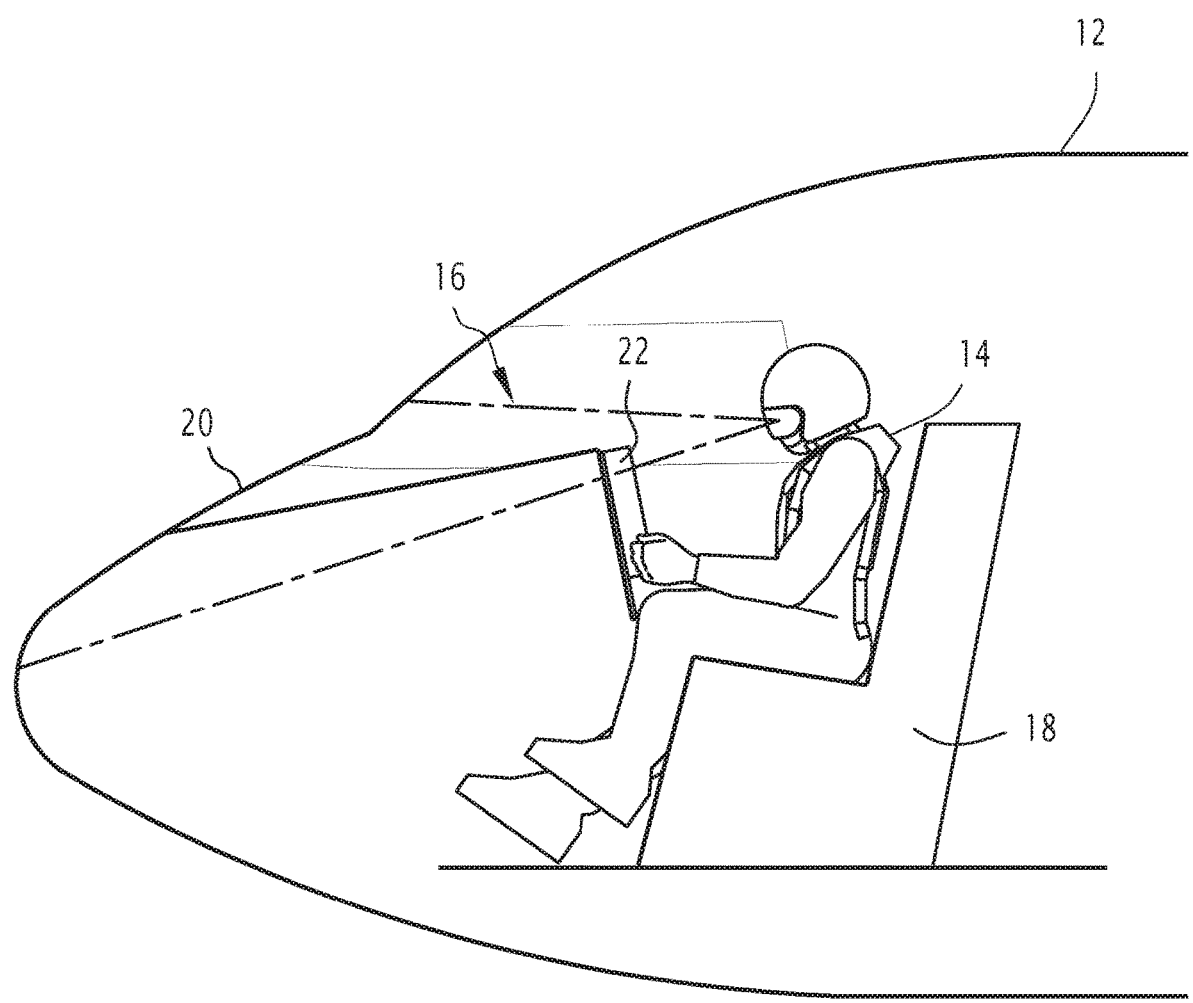
FIG. 2 shows a schematic side view of a cockpit of the aircraft of FIG. 1.

As may be seen in FIG. 2, the aircraft 12 comprises a cockpit 16.

The cockpit 16 comprises at least one seat 18 of the pilot 14 and a windshield 20 at least partially transparent and separating the interior of the cockpit 16 from the external environment of the aircraft 12.

The cockpit 16 further comprises a head-down display screen 22.

In an advantageous embodiment, the aircraft 12 further comprises a flight management system 26.

As may be seen in FIG. 2, the head-down display screen 22 is disposed in the cockpit 16 facing the pilot 14.

The head-down display screen 22 defines a display plane P corresponding for example to its surface.

The head-down display screen 22 is designed to display information in the aircraft 12.

The head-down display screen 22 is also tactile. It is designed to detect each tactile movement made by the driver 14 on the head-down display screen 22.

The flight management system 26 is an onboard computer in the aircraft 12 having software designed to assist the pilot 14 during the flight of the aircraft 12 by providing, for example, information on steering, navigation, fuel consumption, etc.

The planning system 10 comprises an acquisition module 32, a processing module 34, a projection module 36, an output module 38 and an internal memory 40.

Each module 32, 34, 36, 38 of the planning system 10 is, for example, in the form of software implemented by a suitable computer and/or at least partially of a programmable logic circuit, for example of the FPGA type (Field Programmable Gate Array).

The acquisition module 32 is designed to acquire information relating to each tactile movement made by the pilot 14 on the head-down display screen 22.

The acquisition module 32 is designed to send the acquired form to the processing module 34.

The processing module 34 is designed to process the data associated with the form acquired by the acquisition module 32.

The processing module 34 is further designed to communicate with the projection module 36, the output module 38, and the flight management system 26.

The processing module 34 is also advantageously designed to communicate with at least one remote system 42 of the aircraft 12. The remote element 42 may be, for example, surrounding aircraft or a control tower, as may be seen in FIG. 1.

In addition, the processing module 34 is advantageously designed to store data in the internal memory 40 of the aircraft 12.

Advantageously, the processing module 34 is further designed to send data to a memory 44 external to the aircraft 12 in order to store them. The external memory 44 may be, for example, a computer server.

The projection module 36 is designed to receive data from the processing module 34, to process them, and to send the result of the processing to the processing module 34 and the output module 38.

The output module 38 is designed to display an image on the head-down display screen 22 from the data sent by the projection module 36.

Figure 3:
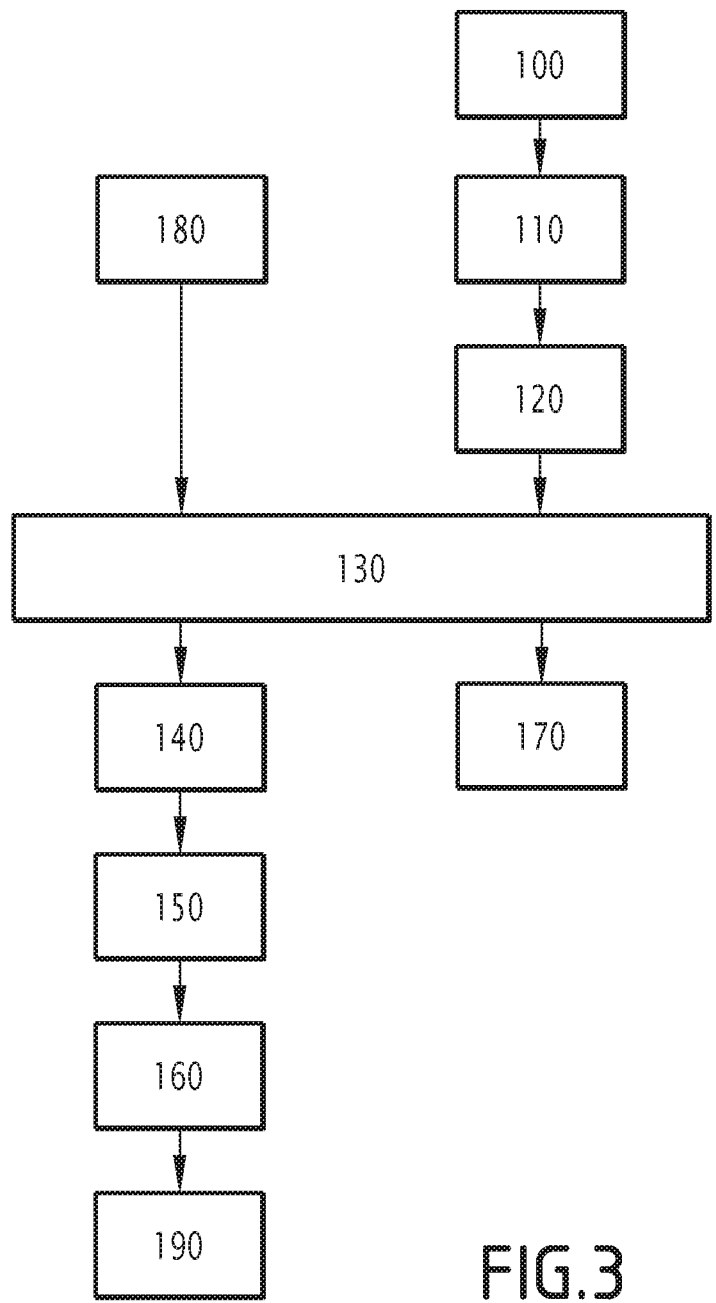
FIG. 3 shows a flowchart of a planning method according to the invention, the method being implemented by the display system of FIG. 1.

A flight planning display method of an aircraft 12 according to the invention will now be described with reference to FIG. 3 presenting a flowchart of its steps.

This method is implemented by the planning system 10.

Initially, the pilot 14 is installed in the cockpit 16.

In the initial step 100, the head-down display screen 22 displays images.

In particular, the display screen 22 displays images representing a three-dimensional surface S in perspective seen through the display plane P and arranged with respect to this display plane P according to at least one display parameter.

The three-dimensional surface S comprises a reference axis A-A'. The reference axis A-A' extends substantially along the normal of the three-dimensional surface S at a reference point B.

In such a case, the display parameter is, for example, the angle $\alpha$ defined between the reference axis A-A' and the display plane P.

Figure 4:
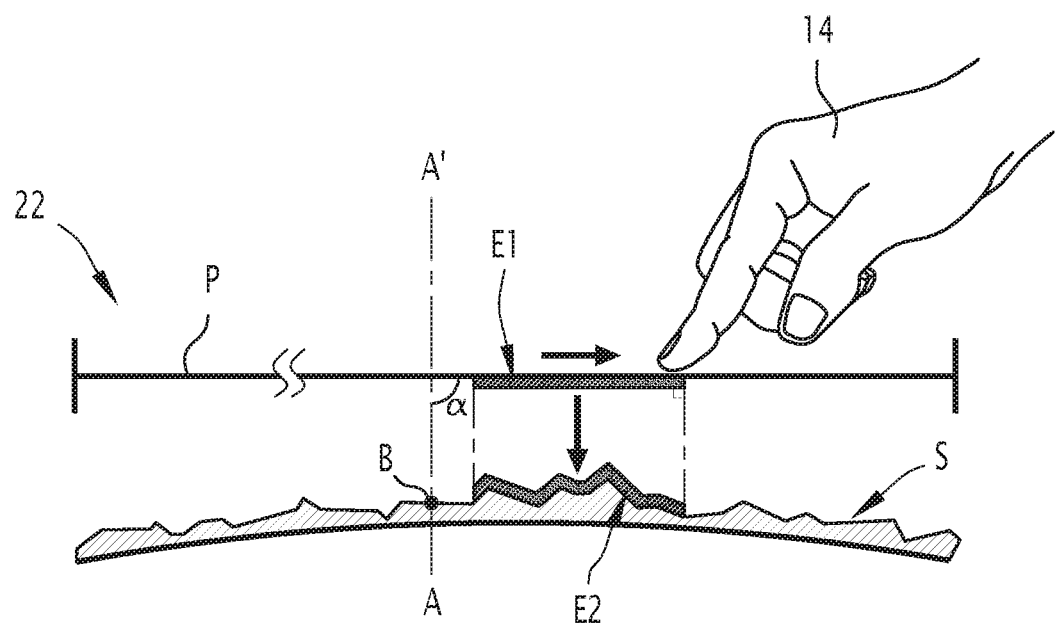
FIGS. 4 and 5 show schematic views explaining the implementation of certain steps of the method of FIG. 3.
Figure 5:
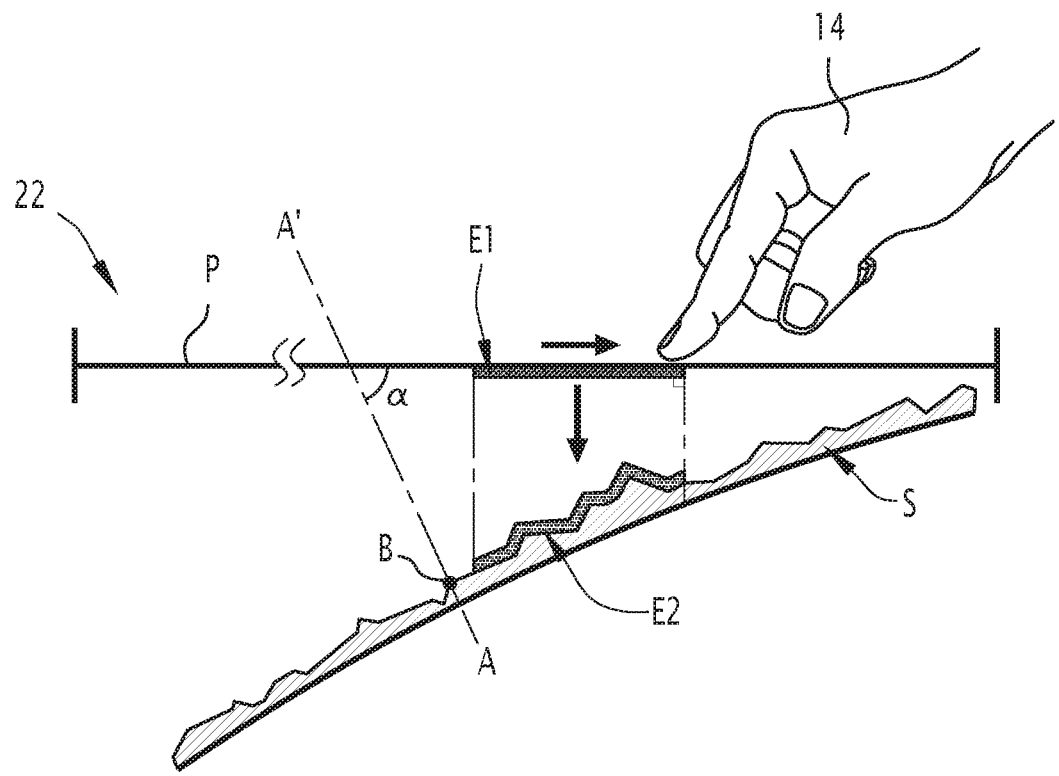

Thus, as may be seen in FIGS. 4 and 5, the display parameter makes it possible to change the perspective perceived by a pilot 14 observing the three-dimensional surface S through the display screen 22.

The three-dimensional surface S corresponds, for example, to the relief of the terrain overflown by the aircraft 12.

The relief consists of a set of geographical points, each geographic point being associated with a specific geographic location of the environment of the aircraft 12. Each geographical point is defined by its three geographical coordinates, for example, by its latitude, its longitude, and its altitude.

The display of the relief in the three spatial dimensions allows a better perception of the environment of the aircraft 12 by the pilot 14.

The method is implemented when the pilot 14 moves at least one finger on the tactile head-down display screen 22.

Thus, in step 110, the acquisition module 32 acquires information relating to the tactile displacement of the pilot 14 on the head-down display screen 22.

In particular, the acquisition module 32 acquires a geometric shape associated with the tactile displacement.

The acquisition module 32 further detects whether the tactile movement of the pilot 14 takes place along an open line or a closed line.

The acquisition module 32 then sends the information associated with the tactile displacement to the processing module 34.

In the next step 120, the processing module 34 associates the information relating to the tactile displacement of the pilot 14 to a first set of points E1 located in the display plane P.

In particular, during the tactile movement of the pilot 14 along an open line, the first set of points E1 is then a line.

During the tactile movement of the pilot 14 along a closed line, the first set of points E1 is then a two-dimensional zone.

The processing module 34 sends the position of the first set of points E1 to the projection module 36.

Then, during the next step 130, the projection module 36 projects the first set of points E1 on the three-dimensional surface S displayed, in order to obtain a second set of geographical points E2 located on this three-dimensional surface S.

As may be seen in FIGS. 4 and 5, the projection of the first set of points E1 on the environment advantageously takes place in a projection direction orthogonal to the display plane P.

The projection module 36 sends the position of the second set of points E2 to the output module 38 and advantageously to the processing module 36.

In the next step 140, the output module 38 displays images representing the second set of points E2 on the head-down display screen 22.

Then, the planning method comprises an optional step 150 of enabling or canceling the display on the screen 22 of sets of geographical points E2, E3. The validation or cancellation is performed by the processing module 34 on the basis of information provided by the pilot 14. For example, when the pilot 14 presses a button displayed on the screen 22, the acquisition module 32 detects the finger contact of the pilot 14 on the screen and sends the associated information to the processing module. In a variant, the pilot 14 may transmit a voice command received by the processing module 34.

Following validation by the processing module 34 during the step 160, the set of points E2, E3 is stored in the internal memory 40 of the aircraft 12 during the step 150.

Advantageously, the set of points E2, E3 is sent outside the aircraft 12 and stored in the memory 44 external to the aircraft 12.

Following step 130, the planning method advantageously comprises a step 170 of transmitting the set of points E2, E3 to the at least one remote system 42 of the aircraft 12.

In parallel with steps 100 to 130, the planning method advantageously comprises a step 180 for receiving at least a third set of geographical points E3 from outside the aircraft 12. The third set of geographical points E3 is sent by the at least one remote system 42, possibly different from that of step 170.

The third set of points E3 is advantageously a line or a three-dimensional zone located on the three-dimensional surface S.

Then, the third set of points E3 is displayed on the head-down display screen 22 during step 140.

Following step 160, during an optional step 190, the set of points E2, E3 is sent to the flight management system 26.

The flight management system 26 then builds a trajectory of the aircraft 12 from the second set of geographical points E2 associated with the tactile displacement of the pilot 14 along an open line and advantageously from the at least one third set of geographical points E3 received from remote element 42.

In calculating the trajectory, the flight management system 26 takes into account the geographical area of interest from the second set of geographical points E2 associated with the tactile displacement of the pilot 14 along a closed line and advantageously from the at least one third set of geographical points E3 received from the remote element 42.

It will be appreciated that the present invention has a number of advantages.

Firstly, the flight planning method according to the invention makes it easier to identify the elements of interest external to the aircraft 12.

In fact, the tactile definition of the trajectories and areas of interest on the head-down display screen 22 is very intuitive for the pilot 14.

In addition, the representation of the relief in three dimensions allows the pilot to better understand the environment of the aircraft 12.

Thus the invention also facilitates the planning of the trajectory of the aircraft 12 during flight.

The invention also allows improved communication between the pilot 14 and the remote elements 42 outside the aircraft 12 such as surrounding aircraft or a control tower.

The sharing of sets of three-dimensional points E2, E3 does not require the use of speech and thus allows easier communication and understanding. In fact, pattern recognition is universal and does not depend on the language, culture or age of the pilot 14.

Thus, thanks to the invention, it is easy to quickly establish strategies or changes of trajectory in collaboration with the remote elements 42. The invention thus allows significant time savings and a better responsiveness of the pilot 14 in the event of an unforeseen situation.

Finally, the storage of the geographical points E2, E3 in the internal memory 40 and in the external memory 44 makes it possible to obtain a history of the geographical points E2, E3, and share with the different distant elements 42 over time in order to facilitate the development of future flights of the aircraft 12.

The invention claimed is:

1. A method for planning the flight of an aircraft controllable by at least one pilot and comprising a tactile head-down display screen, the display screen defining a plane display device and displaying images representing a three-dimensional surface in perspective viewed through the display plane and arranged with respect to this display plane as a function of at least one display parameter;

wherein the method comprises:
   acquiring information relating to a tactile displacement made by the pilot on the head-down display screen;
   associating the information relating to the tactile displacement of the pilot with a first set of points situated in the display plane;
   projecting the first set of points on the displayed three-dimensional surface in order to obtain a second set of geographical points located on this three-dimensional surface;
   displaying the images representing the second set of geographical points;
   sending the second set of geographical points to a flight management system embedded in the aircraft; and
   building a flight trajectory of the aircraft from the second set of geographical points, the flight trajectory being different from the second set of geographical points.

2. The method according to claim 1, wherein the three-dimensional surface corresponds to the relief of the terrain overflown by the aircraft.

3. The method according to claim 1, wherein the projecting of the first set of points on the three-dimensional surface is performed in a projection direction orthogonal to the display plane.

4. The method according to claim 1, further comprising transmitting the second set of geographical points to a remote system of the aircraft.

5. The method according to claim 1, further comprising receiving at least a third set of geographical points from a remote system of the aircraft, and displaying the third set of geographical points on the head-down display screen.

6. The method according to claim 1, wherein the information acquired during the tactile movement of the pilot along a closed line is the inner surface defined by the closed line.

7. The method according to claim 1, comprising enabling or canceling the display from information provided by the pilot.

8. The method according to claim 1, comprising storing the second set of geographical points in a memory external to the aircraft.

9. The non-transitory computer-readable medium comprising the software instructions which, when implemented by computer equipment, implement the method according to claim 1.

10. A planning system designed to be embedded in an aircraft controllable by at least one pilot and comprising a tactile head-down display screen, the head-down display screen defining a display plane and displaying images representing a three-dimensional surface viewed in perspective through the display plane and arranged with respect to said display plane as a function of at least one display parameter;

wherein the planning system comprises:
an acquisition module designed to acquire a tactile displacement performed by the pilot on the head-down display screen;
a processing module designed to associate the information relating to the tactile displacement of the pilot with a first set of points, the first set of points being located in the display plane;
a projection module designed to project the first set of points on the displayed three-dimensional surface to obtain a second set of geographical points located on this three-dimensional surface;
an output module designed to display an image representing the second set of geographical points; and
flight management system embedded in the aircraft and configured to receive the second set of geographical points and build a flight trajectory of the aircraft from the second set of geographical points, the flight trajectory being different from the second set of geographical points.

* * * * *